United States Patent
Katou et al.

(10) Patent No.: US 10,025,121 B2
(45) Date of Patent: Jul. 17, 2018

(54) OPTICAL WAVEGUIDE ELEMENT MODULE

(71) Applicant: Sumitomo Osaka Cement Co., Ltd, Tokyo (JP)

(72) Inventors: Kei Katou, Tokyo (JP); Norikazu Miyazaki, Tokyo (JP); Youichi Hosokawa, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/129,857

(22) PCT Filed: Mar. 27, 2015

(86) PCT No.: PCT/JP2015/059667
§ 371 (c)(1),
(2) Date: Sep. 28, 2016

(87) PCT Pub. No.: WO2015/147275
PCT Pub. Date: Oct. 1, 2015

(65) Prior Publication Data
US 2017/0139240 A1    May 18, 2017

(30) Foreign Application Priority Data
Mar. 28, 2014    (JP) .................. 2014-069087

(51) Int. Cl.
*G02F 1/03*    (2006.01)
*G02F 1/035*    (2006.01)

(52) U.S. Cl.
CPC ............ *G02F 1/035* (2013.01); *G02F 1/0316* (2013.01)

(58) Field of Classification Search
CPC ............................... G02F 1/035; G02F 1/0316
See application file for complete search history.

(56) References Cited

U.S. PATENT DOCUMENTS 5,420,868 A    5/1995    Chraplyvy et al.
6,192,167 B1 *    2/2001    Kissa .................... G02F 1/0356
                                                                385/14

(Continued)

FOREIGN PATENT DOCUMENTS

JP    H06209293 A    7/1994
JP    2003066394 A    3/2003

(Continued)

OTHER PUBLICATIONS

International Search Report of PCT/JP2015/059667 dated Jun. 9, 2015.

*Primary Examiner* — Ryan Lepisto
(74) *Attorney, Agent, or Firm* — Taft Stettinius & Hollister LLP

(57) ABSTRACT

An optical waveguide element module decreases discontinuity of electrical connection between an optical waveguide element and a relay substrate, without wire-bonding using long wires. An edge shape L of the signal electrode side of the ground electrode is surrounded by two shapes (L1, L2). Shape L1 is obtained by connecting an input end of the control electrode to a location where a space between the ground electrodes becomes W2. Shape L2 is such that an impedance change of the control electrode from the input end to the location at which the space between the ground electrodes becomes W2 is constant or continuously changes. A space between grounding wires connecting the ground electrodes of the element and ground lines of the relay substrate is larger than a space between the ground electrodes. In an embodiment, a terminal substrate and an output end of the control electrode are connected.

10 Claims, 3 Drawing Sheets

(56) References Cited

U.S. PATENT DOCUMENTS

| | | | |
|---|---|---|---|
| 2003/0002766 A1 | 1/2003 | Pruneri et al. | |
| 2003/0151792 A1* | 8/2003 | Kaitoh | G02F 1/0305 |
| | | | 359/279 |
| 2009/0290830 A1 | 11/2009 | Mitomi et al. | |
| 2011/0268382 A1 | 11/2011 | Takemura et al. | |

FOREIGN PATENT DOCUMENTS

| | | |
|---|---|---|
| JP | 2003233043 A | 8/2003 |
| JP | 5263210 B2 | 8/2013 |
| WO | 2008108154 A1 | 9/2008 |

\* cited by examiner

OPTICAL WAVEGUIDE ELEMENT MODULE

TECHNICAL FIELD

The present invention relates to an optical waveguide element module and particularly to an optical waveguide element module having an optical waveguide element and a connecting substrate housed in a case.

BACKGROUND ART

In optical measurement technical fields or optical communication technical fields, optical waveguide elements having optical waveguides formed in a substrate having an electro-optic effect such as optical modulators or optical switches are widely used. Generally, these optical waveguide elements are housed in a case which is sealed and configured an optical waveguide element module.

As illustrated in FIG. 1, a relay substrate for electrically connecting input signals from the outside to a control electrode (a signal electrode and ground electrodes) in an optical waveguide element or a terminal substrate which is electrically connected to the output side of the control electrode in the optical waveguide element and is intended to terminate propagated electrical signals or lead out the propagated electrical signals to the outside of a case is housed in the case of an optical waveguide element module (refer to Patent Literature No. 1). In the present specification, relay substrates and terminal substrates will be collectively referred to as connecting substrates.

As illustrated in FIG. 1, for example, ground electrodes are formed at the input and output ends of the control electrode in the optical waveguide element so as to put a signal electrode therebetween. In addition, similar to in the control electrode, in a connecting substrate as well, ground lines are formed so as to put a signal line therebetween. In addition, the signal electrode and the ground electrodes at the input and output ends of the control electrode and the signal line and the ground lines in the connecting substrate are electrically connected (wire-bonded) to each other using wires such as gold wire.

In addition, the above-described optical waveguide element module (for example, an optical modulator) is widely used in optical communication technical field, but electrical cable(coaxial cable) for inputting electrical signals to the optical waveguide element module are generally designed to have an impedance of 50Ω, and thus it is desirable to design the signal electrode in the optical waveguide element and the signal line in the ground substrate which are directly or indirectly electrically connected to the electrical cable (the coaxial cable) to have an impedance of 50Ω in order to prevent electric characteristics from being deteriorated due to an impedance mismatch.

In addition, the optical waveguide element having an electro-optic effect is provided with a modulation portion having a length in a range of approximately several millimeters to several centimeters; however, in order to efficiently modulate optical waveguides having a width of several micrometers and a waveguide gap in a range of approximately several tens of micrometers to several hundreds of micrometers, the width of the signal electrode in the modulation portion becomes as extremely narrow as several micrometers to several tens of micrometers. Furthermore, since the distance from the input and output ends of the control electrode in the optical waveguide element to the modulation portion is short, the width of the signal electrode from the input and output ends of the control electrode to the modulation portion becomes, similar to the modulation portion, narrow. However, when the width of the signal electrode that is electrically connected to the connecting substrate is in a range of several micrometers to several tens of micrometers, wire-bonding (the diameters of wires are several tens of micrometer, and the number of bonded wires is two or three) is impossible, and thus a bonding area having, for example, a width of 100 μm or larger and a length of 100 μm or longer is provided in the input and output ends of the control electrode. Therefore, in the input and output ends of the control electrode (including the bonding areas), areas in which the widths of the signal electrode and the ground electrodes (GND) abruptly change exist. It is reported that the above-described abrupt change in the widths of the signal electrode and the ground electrodes (GND) acts as a cause for the generation of discontinuity of electrical connection and causes the electric characteristics of the optical waveguide element module to be deteriorated.

As illustrated in FIG. 2, in the related art (refer to Patent Literature No. 2), it is reported that discontinuity of electrical connection caused by the abrupt change in the widths of the signal electrode and the ground electrodes (GND) is suppressed by electrically connecting (wire-bonding) an area A in which the widths W1 of the ground electrodes on the optical waveguide element abruptly change and ends B of the ground lines on the connecting substrate using wires such as gold wire, and deterioration of the electric characteristics of the optical waveguide element module is prevented.

However, in the wire-bonding of the related art, bonding shapes (loop height, wire length, and the like) or bonding locations vary depending on operators' skills, and thus the suppression efficiency of the discontinuity of electrical connection is not stabilized, and consequently, there are cases in which desired electric characteristics cannot be obtained in optical waveguide element modules. Particularly, the lengths of wires connecting the ground electrodes and the ground lines become long, and thus the above-described disadvantage increases.

Although it is possible to stabilize the variation of the bonding shapes (roof height, wire length, and the like) or the bonding locations by means of the automation of wire-bonding using an exclusive device, it is still necessary to provide at least two long wires regardless of automatic or manual wire-bonding, the number of operation steps due to wire-bonding increases. In addition, there are cases in which long wires are disconnected due to vibration or impact, and thus there is a problem with deterioration of the electric characteristics of optical waveguide element modules due to the reliability of wire-bonding connection.

CITATION LIST

Patent Literature

[Patent Literature No. 1] Japanese Laid-open Patent Publication No. 2003-233043
[Patent Literature No. 2] Japanese Patent No. 5263210

SUMMARY OF INVENTION

Technical Problem

The purpose of the present invention is to solve the above-described problems and provide an optical waveguide element module which is to prevent deterioration of electric characteristics by decreasing discontinuity of electrical connection between an optical waveguide element and a connecting substrate (a relay substrate or a terminal substrate) without wire-bonding using long wires.

Solution to Problem

In order to solve the above-described problems, an optical waveguide element module of the present invention has the following technical characteristics.

(1) An optical waveguide element module including: an optical waveguide element including a substrate having an electro-optic effect, an optical waveguide formed in the substrate, and a control electrode for controlling light waves that transmit through the optical waveguide; and a connecting substrate which is provided outside the optical waveguide element and has a wire electrically connected to the control electrode, the optical waveguide element and the connecting substrate being housed in a case, in which the control electrode is constituted of a signal electrode and ground electrodes which put the signal electrode therebetween, the connecting substrate is provided with a signal line and ground lines which put the signal line therebetween, in the control electrode, a space W2 between the ground electrodes at a portion away from an input end or an output end is narrower than a space W1 between the ground electrodes at the input end or the output end, an edge shape of the signal electrode side of the ground electrode is set to be placed, in case of a plane view, in an area surrounded by two shapes (L1, L2) of a shape L1 obtained by connecting the input end or the output end to a location at which the space between the ground electrodes becomes W2 using a straight line and a shape L2 of the edge which is constituted so that an impedance change of the control electrode from the input end or the output end to the location at which the space between the ground electrodes becomes W2 is constant or continuously changes, and a space between grounding wires which connect the optical waveguide element and the connecting substrate and are connected to the control electrode is larger than the space W1.

(2) The optical waveguide element module according to (1), in which the edge shape of the signal electrode side of the ground electrode is set to become identical to the shape L1.

(3) The optical waveguide element module according to (1), in which the edge shape of the signal electrode side of the ground electrode is a polygonal shape constituted of a plurality of straight lines.

(4) The optical waveguide element module according to (1), in which the edge shape of the signal electrode side of the ground electrode is constituted of a curved line having a single or a plurality of curvature.

(5) The optical waveguide element module according to any one of (1) to (4), in which edge shapes of both sides of the signal electrode are set to become a shape obtained by connecting the input end or the output end to the location at which the space between the ground electrodes becomes W2 using a straight line in case of a plane view.

Advantageous Effects of Invention

Like the present invention, in an optical waveguide element module including an optical waveguide element including a substrate having an electro-optic effect, an optical waveguide formed in the substrate, and a control electrode for controlling light waves that transmit through the optical waveguide, and a connecting substrate which is provided outside the optical waveguide element and has a wire electrically connected to the control electrode, the optical waveguide element and the connecting substrate being housed in a case, since the control electrode is constituted of a signal electrode and ground electrodes which put the signal electrode therebetween, the connecting substrate is provided with a signal line and ground lines which put the signal line therebetween, in the control electrode, a space W2 between the ground electrodes at a portion away from an input end or an output end is narrower than a space W1 between the ground electrodes at the input end or the output end, an edge shape of the signal electrode side of the ground electrode is set to be placed, in case of a plane view, in an area surrounded by two shapes (L1, L2) of a shape L1 obtained by connecting the input end or the output end to a location at which the space between the ground electrodes becomes W2 using a straight line and a shape L2 of the edge which is constituted so that an impedance change of the control electrode from the input end or the output end to the location at which the space between the ground electrodes becomes W2 is constant or continuously changes, and a space between grounding wires which connect the optical waveguide element and the connecting substrate and are connected to the control electrode is larger than the space W1, it is unnecessary to use long wires, and, furthermore, microwave signals that propagate through the ground electrodes propagate the signal electrode side closer than the shape L2 of the ground electrodes, and thus discontinuity of electrical connection between the optical waveguide element and the connecting substrate is reduced, and it becomes possible to prevent deterioration of electric characteristics.

DESCRIPTION OF EMBODIMENTS

Hereinafter, an optical waveguide element module of the present invention will be described in detail using preferred examples.

Figure 3:
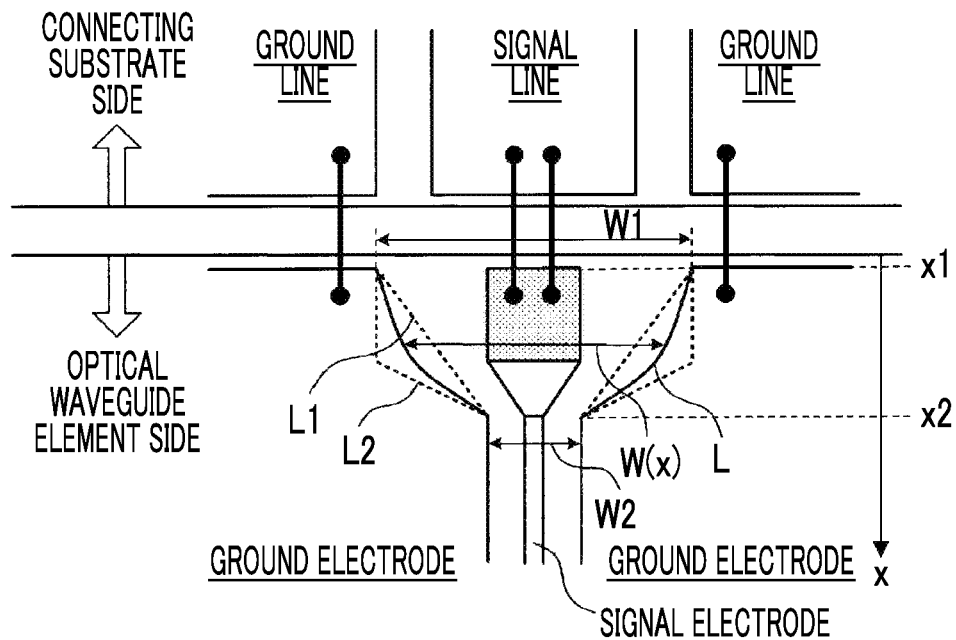
FIG. 3 is a view illustrating a wiring status between the optical waveguide element and the connecting substrate which are used in an optical waveguide element module of the present invention.

The optical waveguide element module of the present invention is featured that an optical waveguide element module including, as illustrated in FIG. 3, an optical waveguide element including a substrate having an electro-optic effect, an optical waveguide formed in the substrate, and a control electrode for controlling light waves that transmit through the optical waveguide; and a connecting substrate which is provided outside the optical waveguide element and has a wire electrically connected to the control electrode, the optical waveguide element and the connecting substrate being housed in a case, in which the control electrode is consisted of a signal electrode and ground electrodes which put the signal electrode therebetween, the connecting substrate is provided with a signal line and ground lines which put the signal line therebetween, in the control electrode, a space W2 between the ground electrodes at a portion away from an input end or an output end is narrower than a space W1 between the ground electrodes at the input end or the output end, an edge shape of the signal electrode side of the ground electrode is set to be placed, in case of a plane view, in an area surrounded by two shapes (L1, L2) of a shape L1 obtained by connecting the input end or the output end to a location at which the space between the ground electrodes becomes W2 using a straight line and a shape L2 of the edge which is constituted so that an impedance change of the control electrode from the input end or the output end to the location at which the space between the ground electrodes becomes W2 is constant or continuously changes, and a space between grounding wires which connect the optical waveguide element and the connecting substrate and are connected to the control electrode is larger than the space W1.

For the substrate having an electro-optic effect, particularly, any single crystal such as $LiNbO_3$, $LiTaO_3$, or lead lanthanum zirconate titanate (PLZT), Si, or a compound semiconductor material such as InP or GaAs can be preferably used. Particularly, $LiNbO_3$ and $LiTaO_3$ which are frequently used in optical modulator may be used. In addition, optical waveguide that is formed in the substrate is formed by, for example, thermally diffusing a high refractive index material such as titanium (Ti) in a $LiNbO_3$ substrate (LN substrate). In addition, ridge type waveguide can also be produced by forming grooves on both sides of optical waveguides or forming optical waveguide portion to be thicker than the other substrate portion.

The control electrode is consisted of a signal electrode and ground electrodes and can be formed by forming a base electrode pattern using Ti and Au on a substrate surface and carrying out a gold plating method or the like. Furthermore, if necessary, it is also possible to provide a buffer layer such as dielectric $SiO_2$ on the substrate surface after the formation of the optical waveguide.

In the present invention, the "connecting substrate" refers to a relay substrate that connects an input terminal through which input signals are input from the outside and a signal input portion of an optical waveguide element, a terminal substrate which is connected to the output end of the signal electrode in the optical waveguide element in order to suppress reflection of electrical signals and in which electrical signals are terminated using a resistor or the like, or the like. As a substrate material for the connecting substrate, a material having lower permittivity than substrate material for optical waveguide elements, for example, alumina or a semiconductor material is used. This is because this material contributes on broadening of the bandwidth of the optical waveguide element.

Particularly, in a case in which the material of the substrate configuring the optical waveguide element and the material of the connecting substrate have different permittivity, the widths of the signal electrode at the input end and the output end of the control electrode and the width of the signal line in the connecting substrate or the space between the ground electrodes in the control electrode and the space between the ground lines in the connecting substrate vary respectively, and thus it becomes more preferable to employ the configuration of the present invention.

As wires that electrically connect the optical waveguide element and the connecting substrate, conductive wires such as gold or ribbons with a wider width can be used, and the number of the wires is not limited to one, and it is also possible to connect the vicinities of the same place using multiple conductive wires or ribbons.

A characteristic of the present invention is the adjustment of a change W(x) in the width of the control electrode, particularly, between the ground electrodes (the shape on the signal electrode side of the ground electrode) as illustrated in FIG. 3. The internal direction (x-axis direction) of the substrate is set using one side surface of the substrate on which the input end or the output end of the control electrode (the signal electrode and the ground electrodes) of the optical waveguide element are located as a reference. FIG. 3 is a view of the optical waveguide element and the connecting substrate when seen in a plan from above.

At a point x1 in the x-axis coordination, the input end and the output end of the control electrode are located. The signal electrode may be located inner side (downwards indicated by the x axis) than the ground electrodes to a certain extent. It is needless to say that the reverse positional relationship is also possible. At the coordination x1, the space between the ground electrodes is indicated by W1. In addition, a point x2 in the x-axis coordination is a starting point of routing the control electrode (signal electrode), and, generally, the impedance at this location is set to a desired value, for example, 50Ω (identical to the impedance of external electric cables). At the coordination x2, the space between the ground electrodes is indicated by W2.

Figure 1:
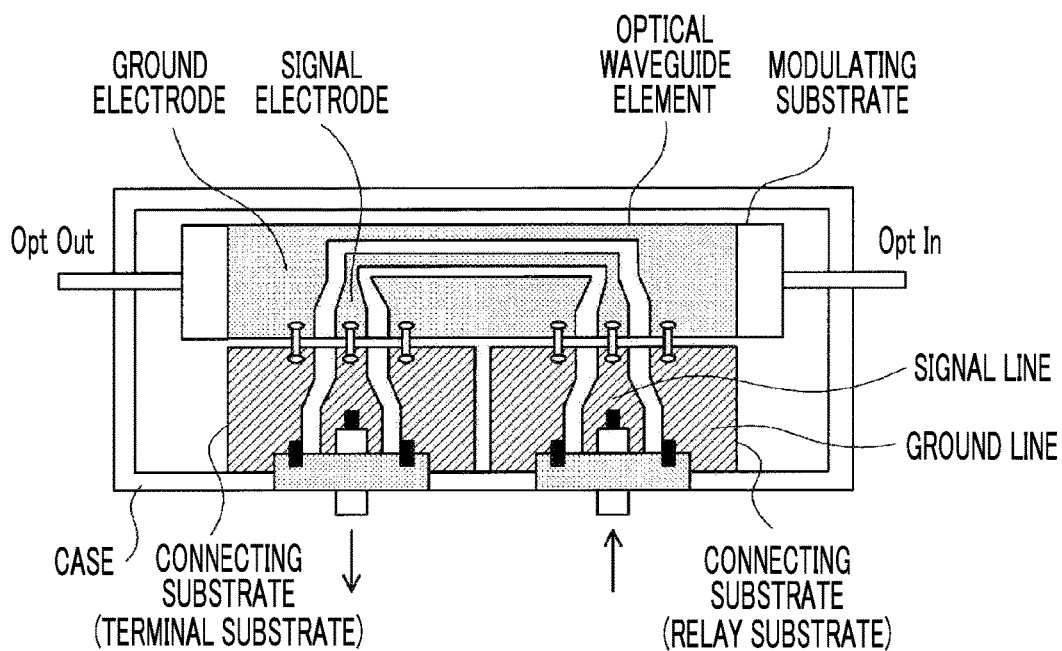
FIG. 1 is a view illustrating an outline of a constitution of an optical waveguide element module.
Figure 2:
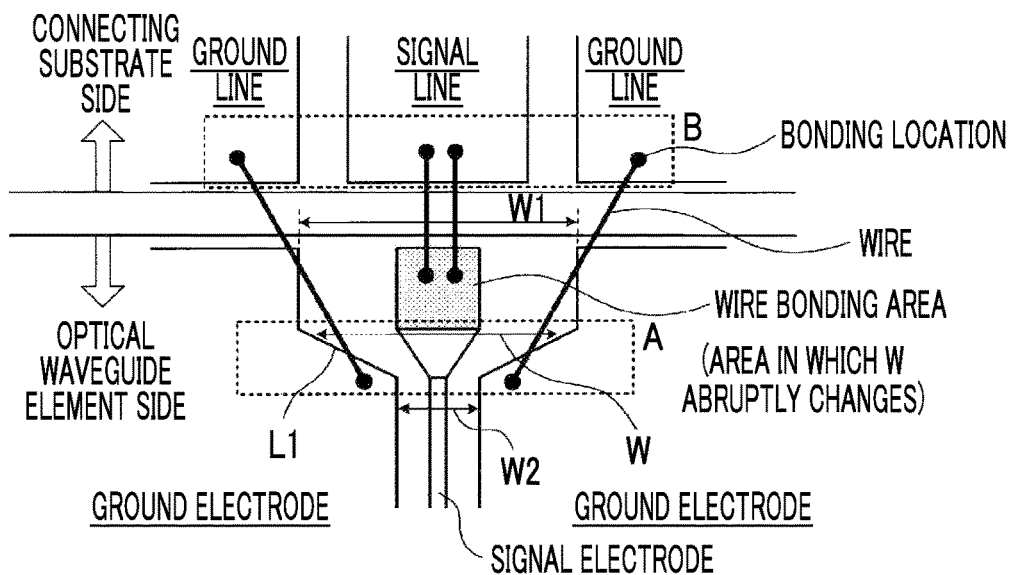
FIG. 2 is a view illustrating a connection status between an optical waveguide element and a connecting substrate which is disclosed by Patent Literature No. 2.

In the related art, in an area from the point x1 to the point x2, the shape on the signal electrode side of the ground electrode has been determined so that the impedance is constant or continuously changes (either continuously decreases or continuously increases) in response to a change in the shape of the signal electrode as indicated by the shape L2 in FIG. 2 or 3.

However, in this state, when the vicinity of the coordination x1 is wire-bonded for grounding as illustrated in FIG. 3 without using long wires, microwave signals in the ground electrodes are propagating only along the shape L2 and transmit in a roundabout manner. Therefore, attenuation or deterioration of electrical signals are occurred so that it causes the electric characteristics of the optical waveguide element to be deteriorated.

In order to suppress the above-described roundabout transmission, the shape L1 is obtained by connecting the coordination x1 and the coordination x2 using a straight line, thereby setting the propagation distance of the microwave signals to be minimized. In the optical waveguide element module of the present invention, the edge shape L of the ground electrode in an area from the coordination x1 to the coordination x2 is set to be located in an area surrounded by two shapes (L1, L2). Meanwhile, in the present invention, a case in which the shape L coincides with the shape L2 will not be considered.

Since the edge shape L becomes a ground electrode pattern in which the electric field distribution abruptly changes as the shape changes from the shape L1 to the shape L2, the ground electrode pattern may be constituted so as to approximate to the shape L1 as much as possible.

In a case in which the edge shape L of the ground electrode is set as illustrated in FIG. 3 in an area from the coordination x1 to x2, the impedance abruptly changes. For example, the impedance changes so as to decrease first and then increase in an area from the coordination x1 to x2. The above-described impedance change causes an impedance mismatch, and there is a concern that the microwave signals may be easily reflected. However, it has been found by the present inventors' studies and investigation that a region of the mismatched impedance has a length of several tens of micrometers to several hundreds of micrometers from the coordination x1 to x2 and is sufficiently shorter than those at wavelengths (several millimeters to several centimeters) in an operation frequency range, and deterioration of electric characteristics due to the impedance mismatch is rarely caused.

As a specific example of the edge shape L of the ground electrode, the shape can be constituted of a curve having single or multiple curvature value(s) as illustrated in FIG. 3, but is not limited thereto. A ground electrode pattern which is linear from the end x1 to the starting point of routing electrode x2 of the optical waveguide element so as to coincide with the shape L1 as illustrated in FIG. 4 may be formed.

Figure 5:
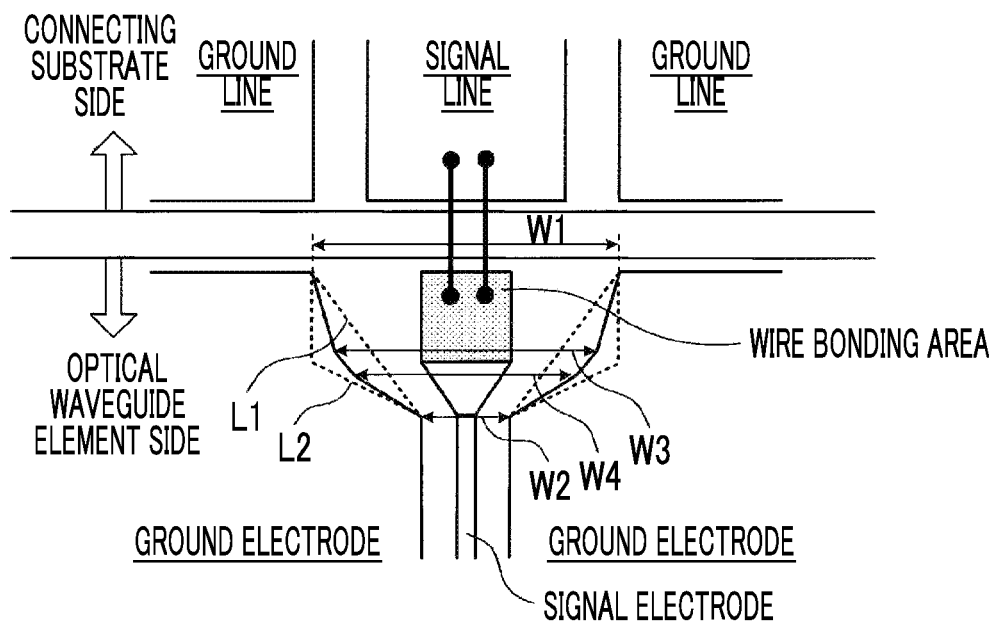
FIG. 5 is a view illustrating an embodiment of the optical waveguide element module of the present invention and an example in which the edge shape of the signal electrode side of the ground electrode is set to be a polygonal shape in an area in which the space between the ground electrodes becomes W2 from W1.

Furthermore, the edge shape L can also be set to be a polygonal shape consisted of plural straight lines so as to bend at a location of the width W3 or W4 as illustrated in FIG. 5.

Figure 4:
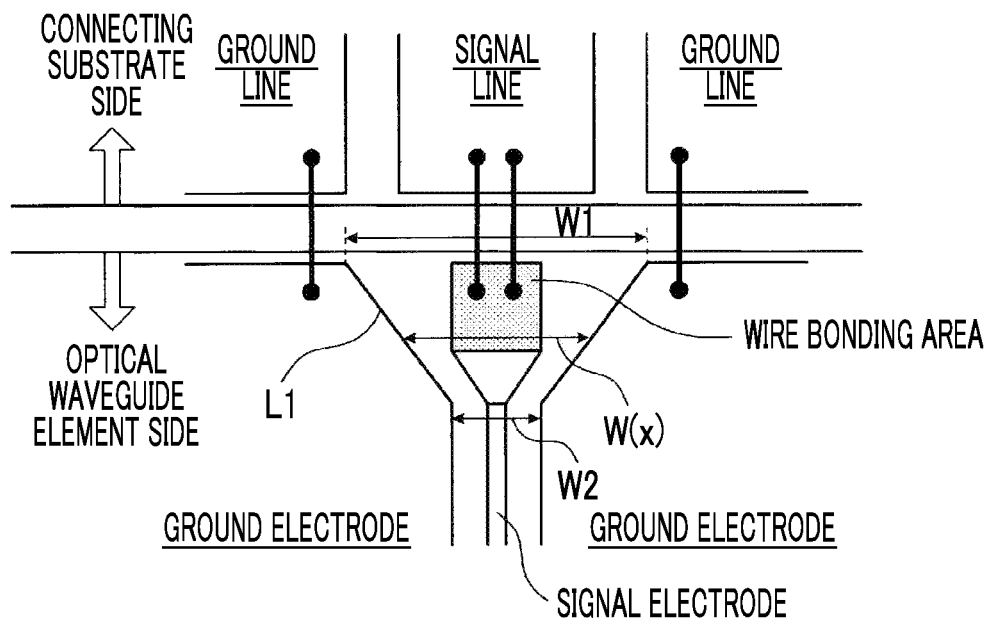
FIG. 4 is a view illustrating an embodiment of the optical waveguide element module of the present invention and an example in which the edge shape of a signal electrode side of a ground electrode is set to be a linear shape in an area in which a space between the ground electrodes becomes W2 from W1.
Figure 6:
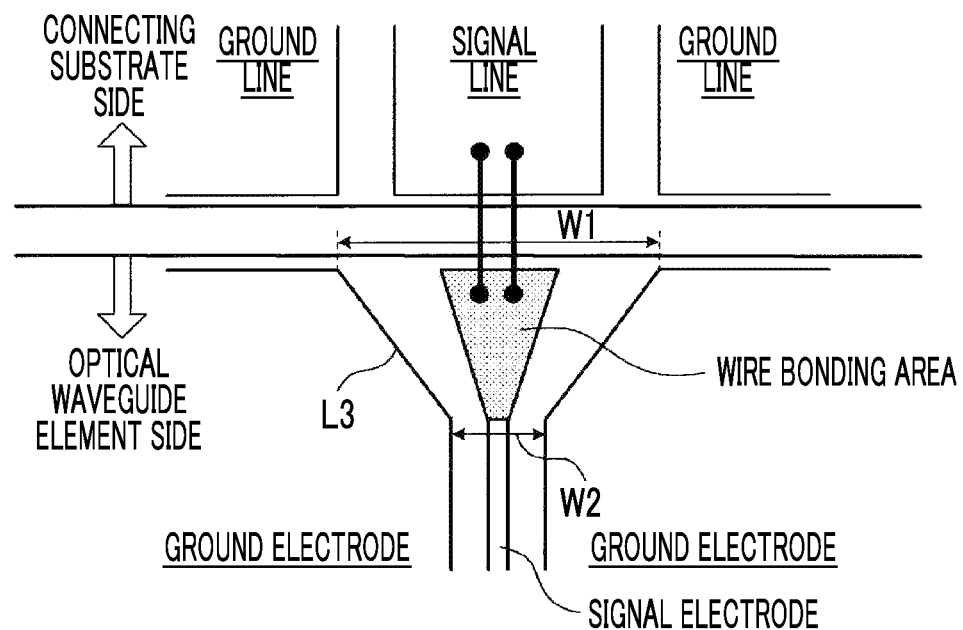
FIG. 6 is a view illustrating an embodiment of the optical waveguide element module of the present invention and an example in which a wire-bonding area is formed in a taper shape.

In addition, in FIGS. 3 to 5, the electrode patterns in the wire-bonding areas have a square form (or a rectangular form), but do not need to have these shapes as long as an area for wire-bonding can be secured. As illustrated in FIG. 6, the shape of the wire-bonding area of the signal electrode can be a shape (a taper shape) obtained by connecting the input end or the output end at the coordination x1 to the location at which the space between the ground electrodes becomes W2 at the coordination x2 using a straight line. In this case, when the edge shape the ground electrode is set as indicated by L3, and a configuration in which each of the widths of the signal electrode and the ground electrodes (GND) gradually changes is employed, discontinuity of electrical connection caused by an abrupt change in the electric field distribution is suppressed, and the electric characteristics of the optical waveguide element module are not easily deteriorated.

In an aspect of the present invention, the mismatch of electrical connection which is caused by an abrupt change in the electric field distribution has been suppressed by applying a ground electrode pattern in which the ground electrode width W(x) gradually changes from the electrode end x1 of the optical waveguide element toward the starting point of routing electrode x2, and deterioration of the electric characteristics of the optical waveguide element module has been prevented. Since the ground electrodes (GND) can be formed at the same time as other electrode patterns which are formed in the optical waveguide element, manufacturing process do not become complex. Furthermore, it is not necessary to use long wires as in Patent Literature No. 2, and work man-hour due to wire-bonding can be decreased.

In addition, since the control electrode can be formed using photolithographic technique having a highly patterning accuracy, it is possible to obtain ground electrode patterns which have a ground electrode width W(x) varying only to a small extent and are stabilized compared with the accuracy of wire-bonding, and, consequently, desired electric characteristics can be stably obtained. Furthermore, since base electrodes (films) formed using photolithographic techniques have extremely high contact to substrates and have no concern of being disconnected unlike wire-bonding, it is possible to provide optical waveguide element module having high reliability.

INDUSTRIAL APPLICABILITY

As described above, according to the preset invention, it becomes possible to provide an optical waveguide element module which is to prevent deterioration of electric characteristics by decreasing discontinuity of electrical connection between an optical waveguide element and a connecting substrate (a relay substrate or a terminal substrate) without wire-bonding using long wires.

The invention claimed is:

1. An optical waveguide element module comprising:
   an optical waveguide element including a substrate having an electro-optic effect, an optical waveguide formed in the substrate, and a control electrode for controlling light waves that propagate through the optical waveguide; and
   a relay substrate which is provided outside the optical waveguide element and has a wire electrically connected to an input end of the control electrode,
   the optical waveguide element and the relay substrate being housed in a case,
   wherein the control electrode is formed on the substrate of the optical waveguide element, and is constituted of a signal electrode and ground electrodes which put the signal electrode therebetween,
   the wire of the relay substrate is constituted of a signal line and ground lines which put the signal line therebetween,
   a width of the signal electrode at the input end is smaller than a width of the signal line at an output end of the wire,
   in the control electrode of the optical waveguide element, a space W2 between the ground electrodes at a portion away from the input end is narrower than a space W1 between the ground electrodes at the input end,
   an edge shape (L) of an edge of the signal electrode side of the ground electrode, in a case of a plane view,
      is set to coincide with a first line L1 obtained by connecting the input end to a location at which the space between the ground electrodes becomes W2 using a straight line, or
      is placed within an area surrounded by first line L1 and a second line L2 positioned along a line where a shape of the signal electrode has a rectangular part as a wire-bonding area and a taper part provided from the wire-bonding area to a modulation portion, and a shape of an edge of the signal electrode side of the ground electrode is changed along the shape of the signal electrode wherein an impedance change of the control electrode from the input end to the location at which the space between the ground electrodes becomes W2 is constant or continuously changes,
   the edge shape (L) is not the same as the second line L2, and
   a space between grounding wires which connect the ground electrodes of the optical waveguide element and the ground lines of the relay substrate is larger than the space W1.

2. The optical waveguide element module according to claim 1,
wherein the edge shape of the signal electrode side of the ground electrode is set to coincide with the first line L1.

3. The optical waveguide element module according to claim 1, wherein the edge shape of the signal electrode side of the ground electrode is placed within the area surrounded by first line L1 and second line L2, and
is a shape constituted of a plurality of straight lines.

4. The optical waveguide element module according to claim 1, wherein the edge shape of the signal electrode side of the ground electrode is placed within the area surrounded by first line L1 and second line L2, and
is constituted of a curved line having a single or a plurality of curvature.

5. The optical waveguide element module according to claim 1, wherein a material of the substrate configuring the optical waveguide element and a material of the relay substrate have different permittivity.

6. An optical waveguide element module comprising:
an optical waveguide element including a substrate having an electro-optic effect, an optical waveguide formed in the substrate, and a control electrode for controlling light waves that propagate through the optical waveguide; and
a terminal substrate which is provided outside the optical waveguide element and has a wire electrically connected to an output end of the control electrode,
the optical waveguide element and the terminal substrate being housed in a case,
wherein the control electrode is formed on the substrate of the optical waveguide element, and is constituted of a signal electrode and ground electrodes which put the signal electrode therebetween,
the wire of the terminal substrate is constituted of a signal line and ground lines which put the signal line therebetween,
a width of the signal electrode at the output end is smaller than a width of the signal line at an input end of the wire,
in the control electrode of the optical waveguide element, a space W2 between the ground electrodes at a portion away from the output end is narrower than a space W1 between the ground electrodes at the output end,
an edge shape (L) of an edge of the signal electrode side of the ground electrode, in a case of a plane view,
is set to coincide with a first line L1 obtained by connecting the output end to a location at which the space between the ground electrodes becomes W2 using a straight line, or
is placed within an area surrounded by first line L1 and a second line L2 positioned along a line where a shape of the signal electrode has a rectangular part as a wire-bonding area and a taper part provided from the wire-bonding area to a modulation portion, and a shape of an edge of the signal electrode side of the ground electrode is changed along the shape of the signal electrode wherein an impedance change of the control electrode from the output end to the location at which the space between the ground electrodes becomes W2 is constant or continuously changes,
the edge shape (L) is not the same as the second line L2, and
a space between grounding wires which connect the ground electrodes of the optical waveguide element and the ground lines of the terminal substrate is larger than the space W1.

7. The optical waveguide element module according to claim 6,
wherein the edge shape of the signal electrode side of the ground electrode is set to coincide with the first line L1.

8. The optical waveguide element module according to claim 6,
wherein the edge shape of the signal electrode side of the ground electrode is placed within the area surrounded by first line L1 and second line L2, and
is a shape constituted of a plurality of straight lines.

9. The optical waveguide element module according to claim 6,
wherein the edge shape of the signal electrode side of the ground electrode is placed within the area surrounded by first line L1 and second line L2, and
is constituted of a curved line having a single or a plurality of curvature.

10. The optical waveguide element module according to claim 6, wherein a material of the substrate configuring the optical waveguide element and a material of the terminal substrate have different permittivity.

* * * * *